Figure 1:
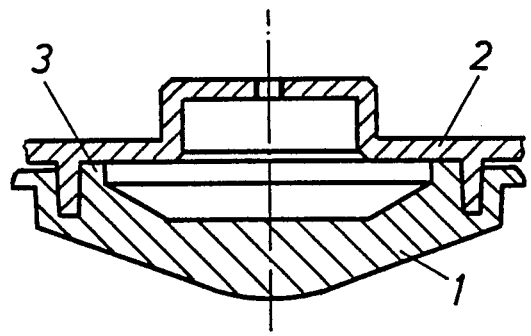

United States Patent [19]

Caspers

[11] Patent Number: 4,767,105
[45] Date of Patent: Aug. 30, 1988

[54] RESILIENT FOOT FOR CONSUMER-ELECTRONICS EQUIPMENT

[75] Inventor: Johannes Caspers, Villingen-Schwenningen, Fed. Rep. of Germany

[73] Assignee: Deutsche Thomson-Brandt GmbH, Villingen-Schwenningen, Fed. Rep. of Germany

[21] Appl. No.: 25,290

[22] PCT Filed: Jun. 6, 1986

[86] PCT No.: PCT/EP86/00342
§ 371 Date: Feb. 12, 1987
§ 102(e) Date: Feb. 12, 1987

[30] Foreign Application Priority Data

Jun. 26, 1985 [DE] Fed. Rep. of Germany ....... 3522842

[51] Int. Cl.$^4$ ............................................. G11B 33/08
[52] U.S. Cl. ................... 267/140; 267/153; 267/292; 248/188.9; 248/615
[58] Field of Search ............... 267/294, 139, 140, 153, 267/136, 292, 140.1; 248/638, 677, 188.8, 188.9, 615

[56] References Cited

U.S. PATENT DOCUMENTS 3,652,074  3/1972  Frederickson et al. ........ 267/140 X
3,880,454  4/1975  Häberle et al. .................. 267/140 X

FOREIGN PATENT DOCUMENTS 0009276  of 1888  United Kingdom ............. 248/188.9
0618199  2/1949  United Kingdom ............. 248/188.9

Primary Examiner—George E. A. Halvosa
Assistant Examiner—Matthew C. Graham
Attorney, Agent, or Firm—Max Fogiel

[57] ABSTRACT

An elastic foot for apparatus of consumer electronics, preferably a compact disc player, in which a rubber spherical part is provided with a convex cross-section and with a height which decreases under the weight of a load. In order to maintain the resonance frequency constant even when the foot is subjected to high weight of a series of stacked equipment units on the compact disc player, a protuberance formed inside the rubber part provides for an additional elasticity when the load exceeds a predetermined threshold value.

3 Claims, 1 Drawing Sheet

RESILIENT FOOT FOR CONSUMER-ELECTRONICS EQUIPMENT

The invention concerns a resilient foot for consumer-electronics equipment in accordance with the preamble to the claim.

Providing the housings of compact-disk (CD) players with resilient feet to insulate them from footfall and/or other accelerating forces is known. The resiliency and attenuation employed in the individual feet are dimensioned to prevent any effect on playback at maximal acceleration amplitudes, given the frequency.

The level of the resonance frequency, which derives from the mass of the CD player and the extent of the resulting foot resiliency, is important. At a mass $M=6$ kg for example and a resiliency $C=10$ N/mm the resonance frequency $f_R$ will be 13 Hz if the load is distributed equally over all four feet on the housing. Assuming that the optimal shock absorption for a particular piece of equipment is given, the masses of the other equipment resting on the CD player (in what are called "hi-fi" towers," incorporating amplifiers, tuners, and audiocassette players e.g.) should not affect that optimal absorption. The resiliency of the feet is approximately constant under a heavy load at the state of the art. In this case, however, the resonance frequency drops to lower levels. The consequence can be undesirable footfall sensitivity. The resonance frequency $f_R$ in the present example for instance would decrease to about 7.5 Hz at an additional mass of 12 kg.

The object of the present example is accordingly to find a solution for the foot on a piece of equipment that would by means of an appropriate shape and design as well as by dimensioning the resiliency and attenuation completely eliminate the aforesaid drawback, specifically lowering the resonance frequency at high loads due to constant resiliency.

This object is attained in accordance with the invention in the resilient foot recited in the preamble to the claim by means of the characteristics recited in the body.

Details and an embodiment will now be specified with reference to the drawing.

The presence of a take-over resilience that becomes active in the foot as of a threshold load allows the resonance frequency to be maintained constant in a practical way even when the range of added-on masses is very wide.

The invention will now be specified with reference to the drawing, wherein

Figure 2:
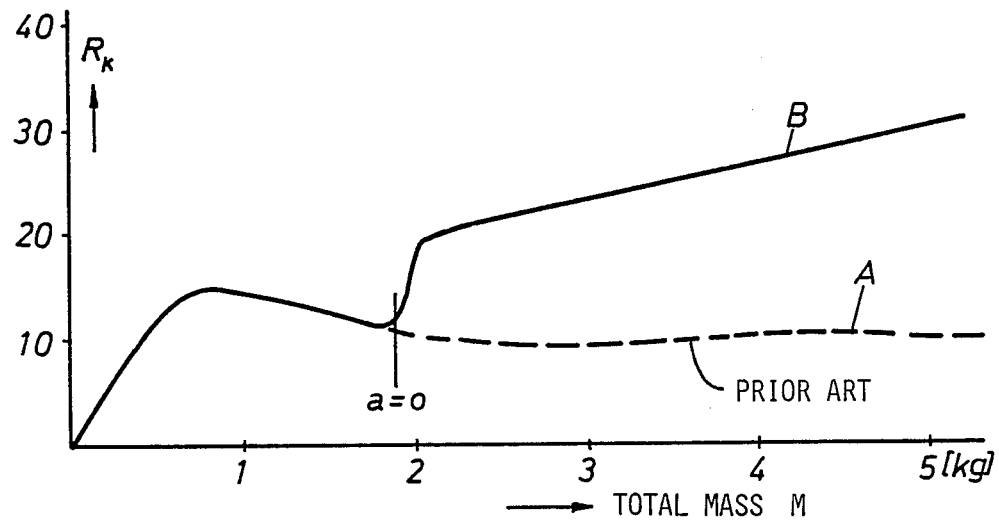
Figure 3:
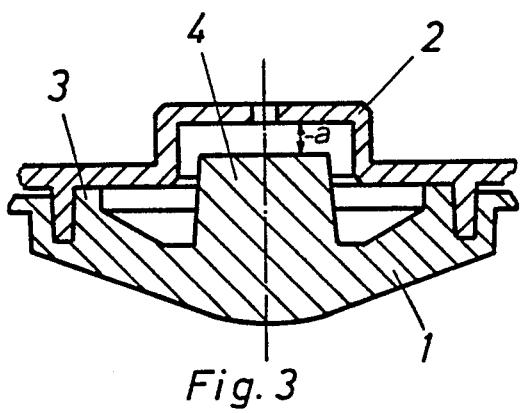

FIG. 1 is a cross-section through a resilient foot for a piece of equipment at the state of the art, FIG. 2 is a graph of the restoring force as a function of the mass that subjects the foot to load, and FIG. 3 is a cross-section through a foot for a piece of equipment in accordance with the invention with an interior take-over resilience.

The foot illustrated in FIG. 1 is shaped like a hollow bowl and made out of rubber. It rests on a continuous lip 3 against the housing 2 of the equipment. Shock absorption occurs at an approximately constant restoring force $R_K = 1/c$ at varying load. FIG. 2 shows the corresponding curve. FIG. 3 contains a take-over resilience in the form of a cast-on plunger 4 that, once it has traveled a certain stroke a, comes into effect as the load increases at a threshold where $a=0$. Thus, as represented by the curve B in FIG. 2, the restoring force $R_K$ will increase with increasing load. At 2 kg per foot for example, the distance a will equal 0 (threshold load) and $R_K$ will constantly increase beyond 2.2 kg. The resonance frequency, however, will remain more or less constant within the range of interest in relation to the masses that supply the load.

The threshold can of course be varied as desired due to the design of the resilience. The same is true of the behavior of restoring force $R_K$ beyond the threshold.

What is claimed is:

1. A resilient shock and vibration absorption foot for communications electronics equipment, comprising: a round rubber member with bowl-shaped crosss-section; at least one continuous lip-shaped portion on said member and surrounding said bow-shaped cross-section at an upper edge thereof for securing against said equipment, said lip-shaped portion having a height decreasing under load and changing shape resiliently; a plunger-shaped portion with resiliency and cast on said member and becoming effective after said member has been displaced relative to said equipment through a predetermined distance by an applied load, said plunger-shaped portion having a restoring force equal to the reciprocal of the resiliency of said plunger-shaped portion, said restoring force increasing constantly and substantially linearly with applied load after displacement through said predetermined distance; said foot and equipment having a resonance frequency dependent on the mass of said equipment and said resiliency and remaining substantially constant.

2. A resilient shock and vibration absorption foot for communications electronics equipment, comprising: a round rubber member with bowl-shaped cross-section; at least one continuous lip-shaped portion on said member and surrounding said bow-shaped cross-section at an upper edge thereof for securing against said equipment, said lip-shaped portion having a height decreasing under load and changing shape resiliently; a plunger-shaped portion with resiliency and cast on said member and becoming effective after said member has been displaced relative to said equipment through a predetermined distance by an applied load, said plunger-shaped portion having a restoring force equal to the reciprocal of the resiliency of said plunger-shaped portion, said foot and equipment having a resonance frequency dependent on the mass of said equipment and said resiliency and remaining substantially constant, said restoring force increasing substantially linearly as a function of equipment mass to a predetermined first value of equipment mass, said restoring force remaining substantially the same as a function of equipment mass from said first value to a predetermined second value where said displacement occurs through said predetermined distance; said restoring force increasing constantly and substantially linearly as a function of equipment mass after said displacement through said predetermined distance.

3. A resilient shock and vibration absorption foot for communications electronics equipment, comprising: a round rubber member with bowl-shaped cross-section; at least one continuous lip-shaped portion on said member and surrounding said bow-shaped cross-section at an upper edge thereof for securing against said equipment, said lip-shaped portion having a height decreasing under load and changing shape resiliently; a plunger-shaped portion with resiliency and cast on said member and becoming effective after said member has been displaced relative to said equipment through a predetermined distance by an applied load, said plunger-shaped portion having a restoring force equal to the reciprocal of the resiliency of said plunger-shaped portion, said foot and equipment having a resonance frequency dependent on the mass of said equipment and said resiliency and remaining substantially constant, said restoring force increasing substantially linearly as a function of equipment mass to a predetermined first value of equipment mass, said restoring force decreasing as a function of equipment mass from said first value to a predetermined second value here said displacement occurs through said predetermined distance, said restoring force increasing constantly and substantially linearly as a function of equipment mass after displacement through said predetermined distance.

* * * * *